United States Patent
Lee

(10) Patent No.: US 7,861,225 B2
(45) Date of Patent: Dec. 28, 2010

(54) SYSTEM AND METHOD TO COMBINE DEBUGGING MESSAGES FROM DIVERSE APPLICATIONS OR OPERATING SYSTEMS EXECUTED WITHIN A MOBILE DEVICE

(75) Inventor: Wayne Lee, Los Altos, CA (US)

(73) Assignee: Qualcomm Incorporated, San Diego, CA (US)

( * ) Notice: Subject to any disclaimer, the term of this patent is extended or adjusted under 35 U.S.C. 154(b) by 1028 days.

(21) Appl. No.: 11/420,220

(22) Filed: May 25, 2006

(65) Prior Publication Data

US 2007/0288896 A1 Dec. 13, 2007

Related U.S. Application Data

(60) Provisional application No. 60/685,951, filed on May 31, 2005.

(51) Int. Cl.
G06F 9/44 (2006.01)
(52) U.S. Cl. .................. 717/124; 717/125; 717/126; 717/127
(58) Field of Classification Search .......... 717/124–127
See application file for complete search history.

(56) References Cited

U.S. PATENT DOCUMENTS

| | | | | |
|---|---|---|---|---|
| 6,918,108 B2 * | 7/2005 | Rajaram | ...................... | 717/126 |
| 7,100,150 B2 * | 8/2006 | Polk | ............................ | 717/124 |
| 7,203,616 B2 * | 4/2007 | Mok | .......................... | 702/117 |
| 7,224,968 B2 * | 5/2007 | Dobson et al. | .............. | 455/423 |
| 7,287,190 B2 * | 10/2007 | Rosenman et al. | ............ | 714/32 |
| 7,334,162 B1 * | 2/2008 | Vakrat et al. | ................... | 714/38 |
| 7,343,587 B2 * | 3/2008 | Moulden et al. | ............. | 717/124 |
| 2002/0066077 A1 * | 5/2002 | Leung | ......................... | 717/126 |
| 2002/0101459 A1 * | 8/2002 | Herle et al. | .................. | 345/866 |
| 2004/0205746 A9 * | 10/2004 | Rajaram | ...................... | 717/173 |
| 2006/0179352 A1 * | 8/2006 | Lau et al. | ....................... | 714/38 |
| 2006/0252462 A1 * | 11/2006 | Balakrishnan et al. | ....... | 455/566 |
| 2007/0037521 A1 * | 2/2007 | Babut et al. | .............. | 455/67.11 |

\* cited by examiner

*Primary Examiner*—Wei Y Zhen
*Assistant Examiner*—Junchun Wu
(74) *Attorney, Agent, or Firm*—James T. Hagler

(57) ABSTRACT

The present invention provides a debugging application operable to synchronize debug information associated with multiple software components to a common frame of reference. These multiple software components may be executed on a common platform and may have distinct diagnostic applications associated with them. This debugging application includes a first diagnostic application operable to gather output diagnostic information associated with the first software application. A second diagnostic application gathers output debug information associated with a second software application. A diagnostic agent receives the diagnostic information associated with both the first software application and the second software application and may combine these using a common frame of reference. This information may then be outputted by the debugging application to an external diagnostic monitor. This eliminates the need for individual operators to cross-reference sources of debug information and in so doing provide an improved debugging environment for development and testing of both application and operating system software applications.

27 Claims, 7 Drawing Sheets

SYSTEM AND METHOD TO COMBINE DEBUGGING MESSAGES FROM DIVERSE APPLICATIONS OR OPERATING SYSTEMS EXECUTED WITHIN A MOBILE DEVICE

CROSS-REFERENCE TO RELATED APPLICATION

This application claims the benefit of priority to U.S. Provisional Patent Application No. 60/685,951 entitled "System and Method to Combine Debugging Messages from Diverse Applications or Operating Systems Executed within a Mobile Device," filed on May 31, 2005, and is incorporated herein by reference in its entirety.

FIELD OF THE INVENTION

The present invention relates generally to cellular wireless communication systems, and more particularly to a system and method to detect, locate and correct errors within a protocol stack or software suite to be implemented within a mobile device.

BACKGROUND OF THE INVENTION

Cellular device system support wireless communication services in many populated areas of the world. While cellular wireless devices were initially constructed to service only voice communications, they are now called upon to support data and video (multimedia) communications as well. Furthermore, these wireless devices also may serve as computing platforms to service a variety of applications. The demand for video and data communication services has exploded with the acceptance and widespread use evermore capable mobile devices and the Internet. Cellular wireless users now demand that their wireless units also support video and data communications. The demand for wireless communications and more versatile computing devices only increase with time. Thus, manufacturers of cellular wireless communication systems are currently attempting to service these burgeoning demands. As the market for mobile devices matures and penetration rates reach saturation, manufacturers are faced with the challenge of introducing a growing number of features within shortening development timescales.

These mobile devices have become complex systems that require an advanced communications protocol stack, interoperability with many network vendors' equipment and support for rich multimedia applications within the constraints of a resource-limited embedded system. Additionally, as operators begin to deploy GPRS, EDGE and 2G networks and services, users demand the latest features and applications. This in turn creates shortened product lives. This shortened product life makes the development time for new mobile devices with the latest features, and, more importantly, the time required to obtain certification, operator approval, and mass produce the mobile device a key issue. The time required to develop the software for the mobile device is a significant part of the development time.

As new technologies and applications are incorporated, these technologies must be proven reliable. Critical factors for software development must be met and these factors include platform quality, application integration quality and product quality. Reference designs provide a quality base on which to build a quality product.

Three key components to mobile device software include the protocol stack, applications framework, and applications. Many consider the protocol stack to be the most complex part. However, interactions between the framework and applications are equally important.

The protocol stack implements the signaling specification and is implemented on Digital Signal Processors (DSPs) and micro controllers such as Advanced Rise Machines (ARMs). These processors execute the various CODECs, radio resource management, mobility management, and call management, are data management. The application framework delivers a platform to create mobile devices with differing functionality and applications. Three broad components to the applications framework support (1) functions and services; (2) call control; and (3) application program interfaces (APIs). The applications typically include a Wireless Application Protocol (WAP) browser for online access, a Multimedia Messaging Service (MMS) client for picture messaging, Java 2 platform, and even an operating system within which gaming and productivity applications are executed.

Previously, these complex mobile devices have not been tested efficiently and effectively in a timely manner. Nor have tools been developed to test these integrated platforms in an effective manner. To provide adequate testing so the integrated end product can be considered ready for deployment, current development requires the tedious and error-prone process of combining cross-referenced diagnostic information from the integrated software applications and protocol stacks and a variety of diagnostic applications. A complete test system is needed that allows testing of multiple software applications within an integrated platform to be performed and integrated in a timely manner.

SUMMARY OF THE INVENTION

In order to overcome the shortcomings of prior debugging and diagnostic processes, the present invention provides a system and method to test a protocol stack to be loaded and implemented within a mobile device. More specifically, the present invention provides a debugging application operable to synchronize debug information associated with multiple software components to a common frame of reference. These multiple software components may be executed on a common platform and may have distinct diagnostic applications associated with them. This debugging application includes a first diagnostic application operable to gather output diagnostic information associated with the first software application. A second diagnostic application gathers output debug information associated with a second software application. A diagnostic agent receives the diagnostic information associated with both the first software application and the second software application and may combine these using a common frame of reference. This information may then be outputted by the debugging application to an external diagnostic monitor. This eliminates the need for individual operators to cross-reference sources of debug information and in so doing provide an improved debugging environment for development and testing of both application and operating system software applications.

BRIEF DESCRIPTION OF THE DRAWINGS

The disclosure is illustrated in conjunction with the drawings in which like reference characters identify corresponding elements throughout. In the drawings, like reference numbers generally indicate identical, functionally similar and/or structurally similar elements.

DETAILED DESCRIPTION OF THE INVENTION

Preferred embodiments of the present invention are illustrated in the Figures, like numerals being used to refer to like and corresponding parts of the various drawings.

Cellular wireless communication systems support wireless links that include both forward link components and reverse link components between the base stations and their serviced mobile devices. These wireless links support digital voice, video, multimedia, and data communications. Data compression allows an increase in the total number of mobile devices serviced by the base stations.

Mobile devices may include audio, video, multimedia and multifunction computing platforms capable cellular telephones, laptop computers. As is generally known, devices such as laptop computers, PDAs, pocket computers and cellular telephones are enabled to "surf" the Internet and execute a wide number of software applications, audio and video communications.

Figure 1:
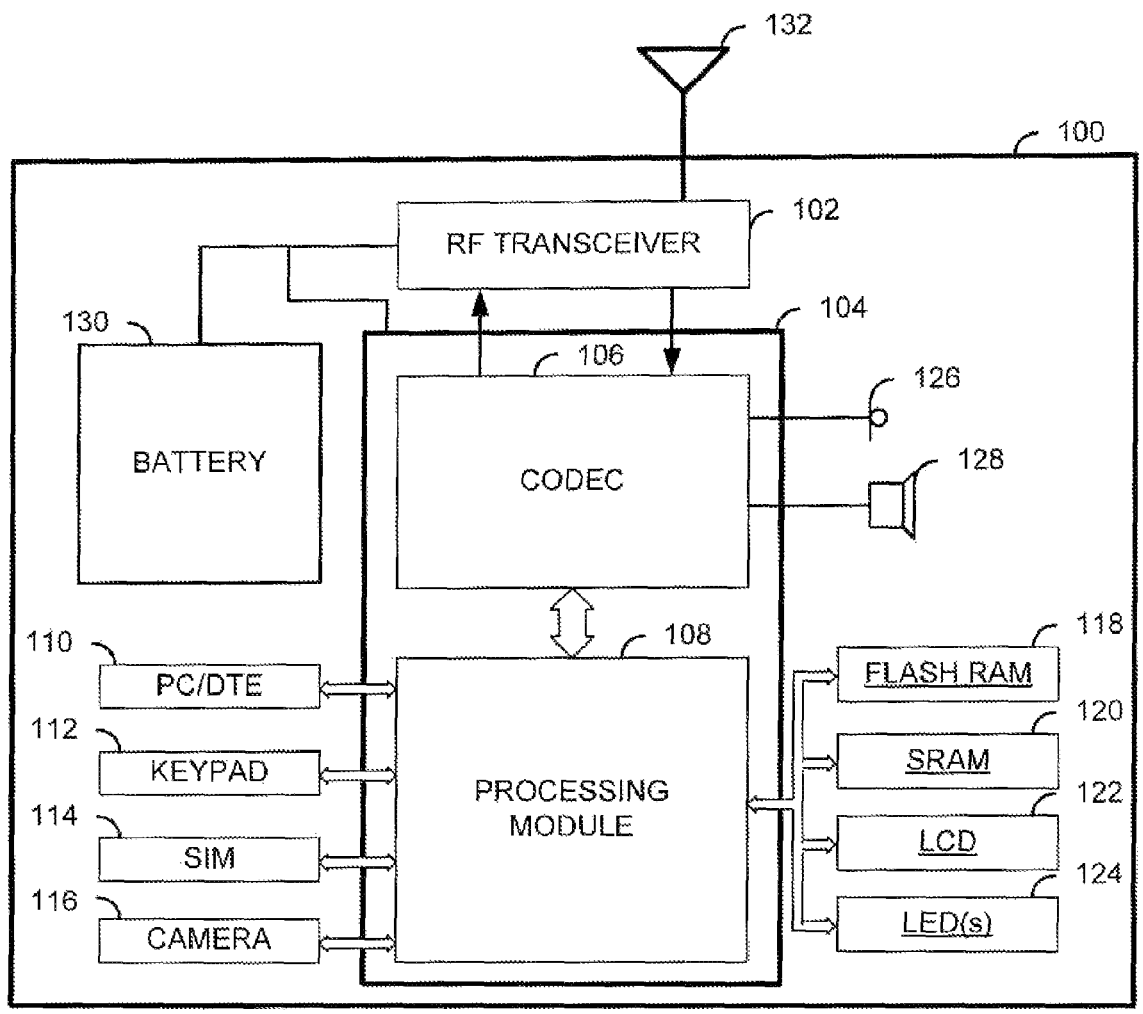
FIG. 1 is a block diagram functionally illustrating a mobile device.

FIG. 1 is a block diagram functionally illustrating mobile device 100 which includes an RF transceiver 102, digital processing components 104, and various other components contained within a case. The digital processing components 104 includes two main functional components, a physical layer processing, speech COder/DECoder (CODEC), baseband CODEC functional block 106 and a protocol processing, man-machine interface functional block 108. Embodiments of mobile device 100 may utilize various architectures to interface the various components. For example, mobile device 100 may use the subscriber unit reference developed by Qualcomm to provide interface between integrated circuits (ICs), such as CDMA ICs and other functional parts of the mobile device. A Digital Signal Processor (DSP) is the major component of the physical layer processing, speech CODEC, and baseband CODEC functional block 106 while a microprocessor, e.g., Reduced Instruction Set Computing (RISC) processor, is the major component of the protocol processing, man-machine interface functional block 108. The development and integration of the protocol stack to be processed will be discussed in further detail with respect to FIG. 2 and following. The DSP may also be referred to as a Radio Interface Processor (RIP) while the RISC processor may be referred to as a system processor. However, these naming conventions are not to be taken as limiting the functions of these components.

The RF transceiver 102 couples to an antenna 132, to the digital processing components 104, and also to a battery 130 that powers all components of mobile device 100. The physical layer processing, speech COder/DECoder (CODEC), and baseband CODEC functional block 106 couples to the protocol processing, man-machine interface functional block 108 and to a coupled microphone 126 and speaker 128. The protocol processing, man-machine interface functional block 108 couples to a Personal Computing/Data Terminal Equipment interface 110, a keypad 112, a Subscriber Identification Module (SIM) port 114, a camera 116, a flash RAM 118, an SRAM 120, a LCD 122, and LED(s) 124. The camera 116 and LCD 122 may support either/both still pictures and moving pictures. Thus, mobile device 100 may support video services and audio services via the cellular network, as well as a variety of software applications.

The processing modules may be also referred to herein as accelerators, co-processors, processing modules, or otherwise, and include auxiliary functions, a compression/decompression accelerator, and a video process accelerator module. The interconnections of FIG. 1 are one example of a manner in which these components may be interconnected. Other embodiments support additional/alternate couplings. Such coupling may be direct, indirect, and/or may be via one or more intermediary components.

Figure 2:
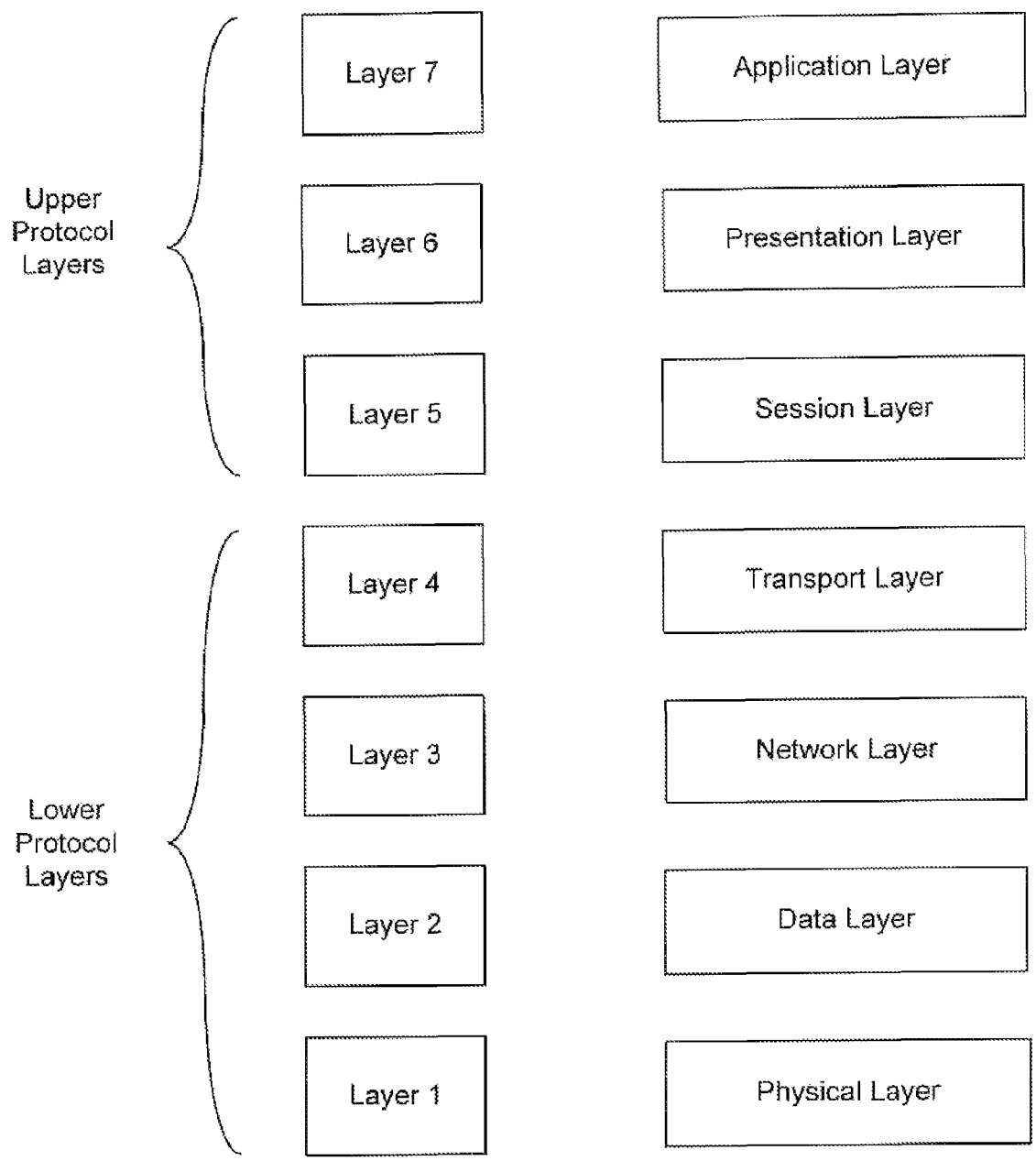
FIG. 2 is a block diagram illustrating the various layers of a protocol stack executed within a mobile device.

FIG. 2 depicts various protocol layers within the Open System Interconnect (OSI) model. This protocol stack is a particular software implementation of computer networking protocol suites within a mobile device. The stack is often thought of as the software implementation of the protocols. Individual protocols are designed with a single purpose in mind. This modularization makes design and evaluation easier. Within embodiments of the present invention, this modularization allows functionalities to be split between various components of the mobile device. The OSI model is divided into seven Layers, with Layers of 1 to 4 often being referred to as lower Layers, and Layers 5 to 7 being referred to as the upper layers. Embodiments of the present invention may divide the processing and execution of the layers between different modules or components within the mobile device.

As shown, layer 1 is the physical layer. Layer 1 defines the hardware implementation and electrical implementation of the bus, network cabling, connector type, pin out, physical data rates, etc. Examples of the physical layer specification include the RS232 and the RS422 specification. Data units at this layer are called bits. Layer 2 is the data layer. Different network and protocol characteristics are defined by different data-link layer specifications. The data-link layer is subdivided into the media access control (MAC) that controls accessing code data into valid signaling formats for the physical layer and the logical link control (LLC), which provides the link to the network layer. Here, the data units are called frames. Layer 3, the network layer, provides address assignments and packet forwarding methods. Data at this layer is often referred to as packets. Layer 4 is the transport layer, which provides transfer correctness, data recovery, and flow control, for example. TCP is a layer for protocol and the protocol data units are called segments in the transport layer. Again, Layers 1 through 4 are often referred to as the lower protocol layers.

Layers 5, 6 and 7 are the upper protocol layers. Layer 5 is the session layer that is responsible for establishing communication sessions, security, and authentication. For example, NetBIOS is a layer 5 protocol. Protocol data units within the session layer are called data. Layer 6 is a presentation layer and determines how the device will represent the data. Again, data at this layer is referred to as data. Layer 7 is the application layer that allows user in the computer systems to generate and interpret data. Layer 7 also may provide for encryption and decryption. Applications using the network learn how to send a request, how to specify a filename, and how to respond to a request. Applications executed by the upper layers of the protocol stack may include operating systems from mobile computing devices. For example, such operating systems may include Windows® and experience such as Windows CE® in the case of pocket computers. Symbian®, Linux®, Solaris®, Debian®, GNU®, UNIX®, and other like operating systems known to those having a skill in the art. Thus, in addition to the typical mobile device protocol stack, the protocol stack of a mobile computing device may include an additional upper layer such as an operating system like Symbian® or Windows CE® to execute client applications within the mobile computing device. For example, Symbian® provides an operating system for advanced functions and applications for data enabled mobile phones. Windows CE® may be found in pocket computers that have been enhanced with the capabilities of a mobile device or wireless terminal. When developing the protocol stack, it is important to be able to properly gather and cross-reference diagnostic information associated with the execution of these various software components. Although the OSI model was described above, the division of responsibilities may be divided within other protocol stacks known to those having skill in the art, such as but not limited to the SS7 protocol stack.

A single processing device or a plurality of processing devices operably coupled to memory performs the processing duties associated with the protocol stack. Such as processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions which may be described later.

Figure 3:
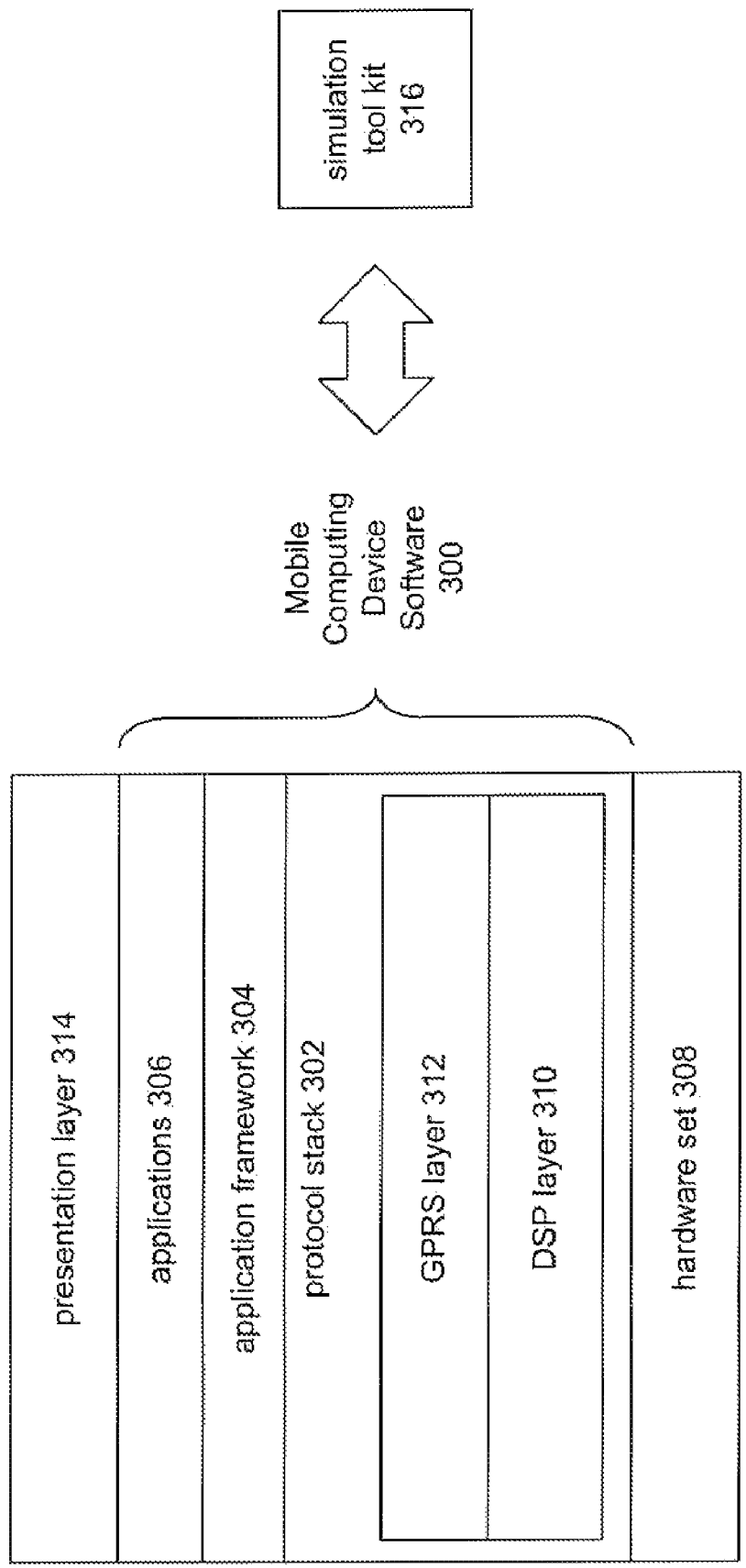
FIG. 3 is a block diagram illustrating the three-key software components within a mobile device.

Mobile devices and mobile computing devices require a complex software set. These devices require a communications protocol stack having interoperability with many network vendors' equipped and able to support rich multimedia applications within the constraints of a resource-limited system. FIG. 3 illustrates the three-key components software 300 within a mobile device. These include protocol stack 302, application framework 304 and applications 306. Protocol stack 302 is often considered to be the most complex part; however, the interaction between application framework 304 and applications 306 is equally important. Protocol stack 302 implements a signaling specification and is implemented on digital signal processors, such as DSP 204, and ARMs.

Software 300 allows hardware set 308 to achieve certain operations. Protocol stack 302 may further include DSP layer 310, and signaling layer 312. Protocol stack 302, application framework 304, and applications 306 allow the user to interact with the mobile device through presentation layer 314. Mobile device software 300 may be developed from case logs associated with the software operations of the mobile device as recorded and analyzed using diagnostic tools such as simulation toolkit 316.

As operations deploy new networks and services, user's demand for improved features and applications is increasing. Development time for new mobile devices is required to be reduced, while the latest features are added. This reduced timeline to obtain certification, operator approval, and mass produce the mobile devices, make the time associated with developing the protocol stack a key issue. New integrated technologies must be proven prior to development and deployment.

Critical factors for software development must be met. These factors include platform quality, application integration quality and product quality. Reference designs provide a base from which to build a new product. Testing of new protocol stacks and mobile computing device software requires the gathering and integration of diagnostic information from a variety of sources. The effect of adding new services exercise the protocol stack in new ways. Therefore, testing ideally stimulates the full integrated product and measures signals at points within the system required.

Figure 4:
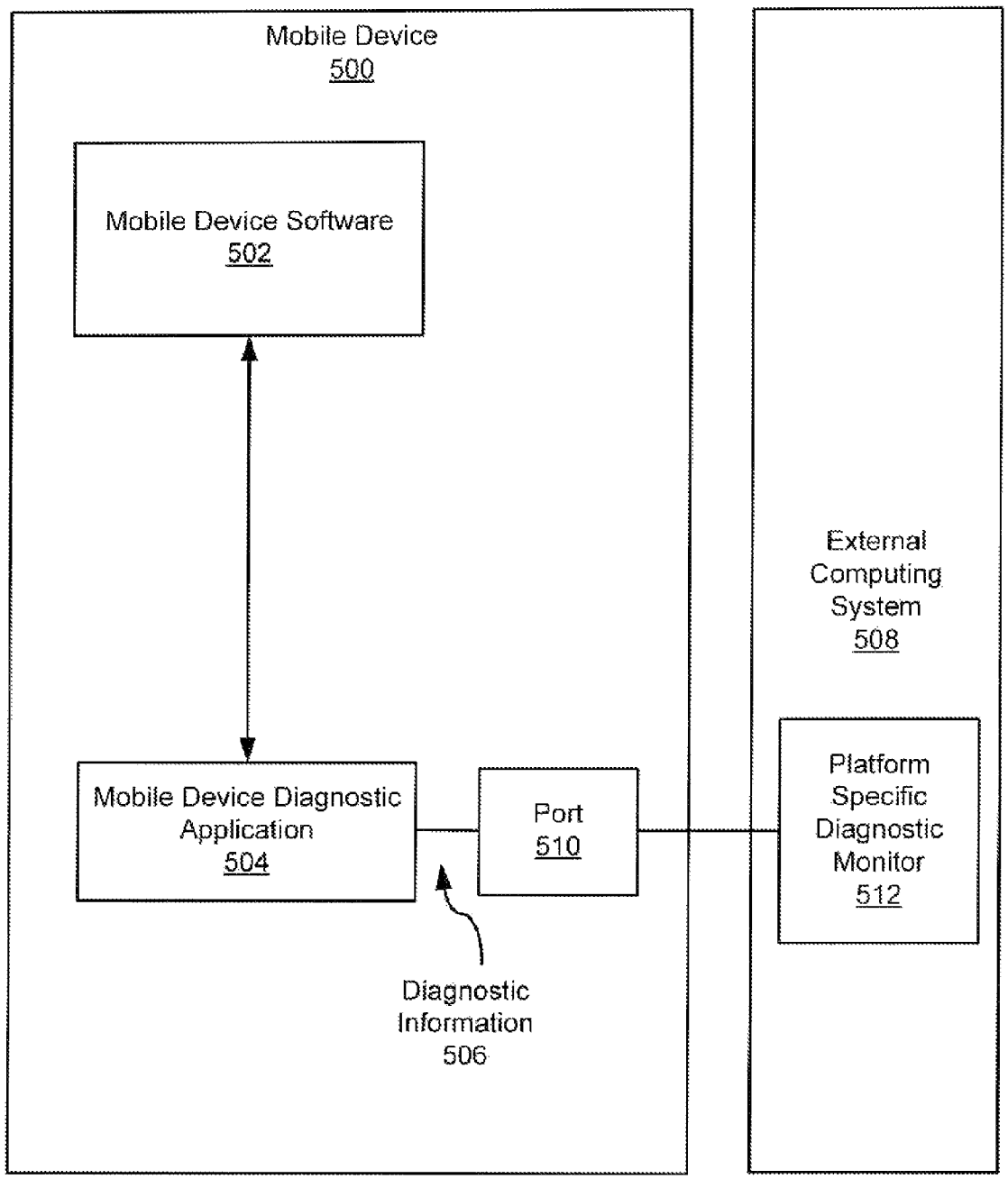
FIG. 4 is a block diagram illustrating the operation of debugging applications on mobile devices.

FIG. 4 provides a prior art example of how debugging applications operate on specialized platforms. For example, such a platform may be a mobile station or wireless terminal that has mobile station software 502 executed by processors within the mobile station. A diagnostic monitor 504 monitors the operation of mobile station software 502 and produces output 506 that may be provided to personal computer 508 through physical port 510, such as a serial port, parallel port, USB port, or other like ports known to those skilled in the art. In such prior art systems, because a limited number of mobile station software applications were executed within the platform, specialized platform-specific diagnostic monitors 512 could be prepared such that they specialize in assisting development and testing of the mobile station software executed within the platform environment. FIG. 4 illustrates that the mobile wireless devices have evolved into mobile computing platforms. This involves both benefits and disadvantages associated with these improved computing platforms. Now applications for email, word processing, games, accounting, spreadsheets or other like applications known to those skilled in the art may be executed within the mobile computing platform.

Figure 5:
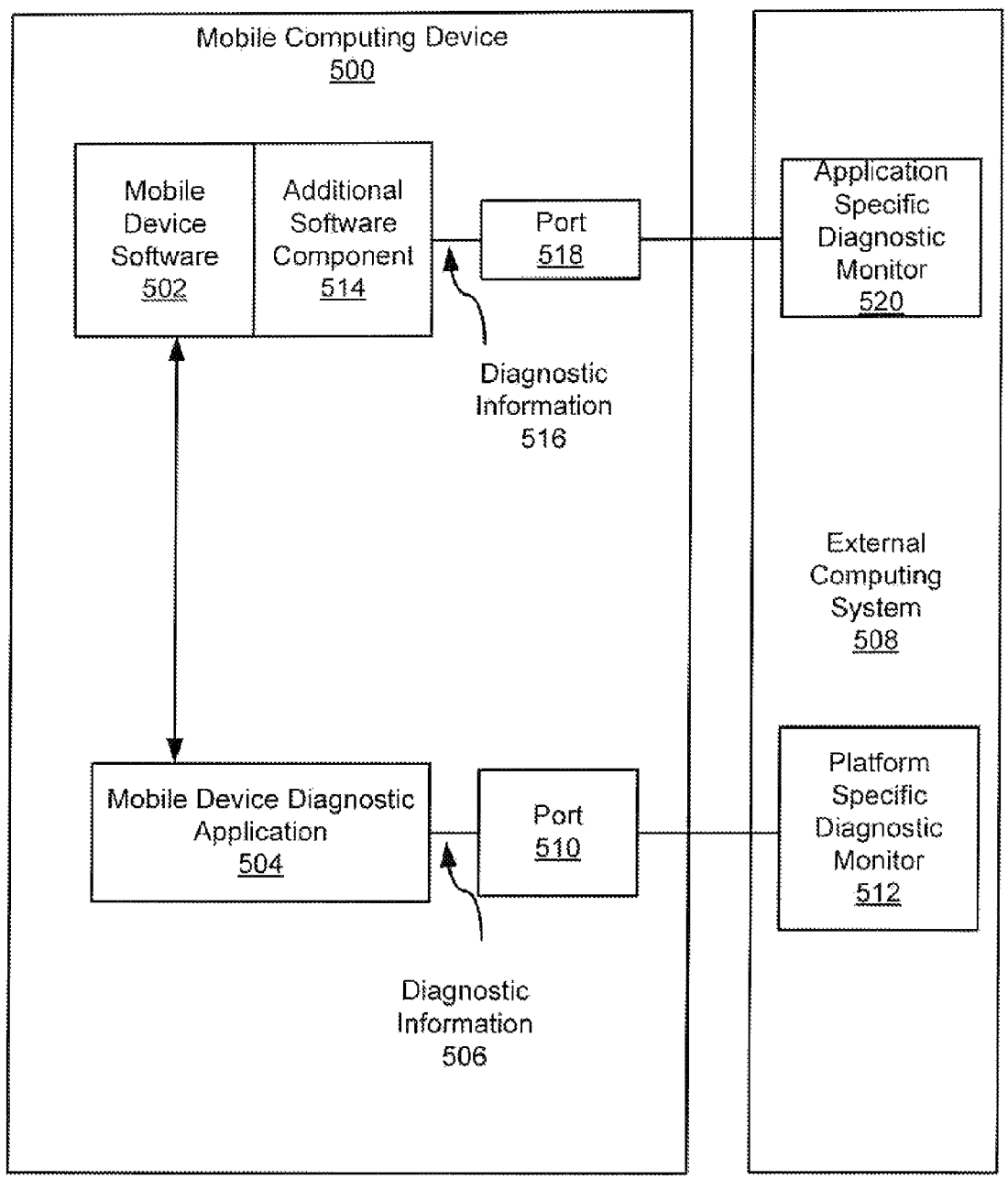
FIG. 5 is a block diagram illustrating the operation of debugging applications on mobile devices.

FIG. 5 shows that in addition to the mobile station system software, an operating system 514 may be executed on the platform as well. Some operating systems may have their own diagnostic monitors, such as Windows CE® has its own set of diagnostic tools that developers and testers may access through an operating system specific diagnostic monitor or diagnostic tool such as platform builder. In this case, diagnostic information is available for development and testing through two parallel paths. Mobile station software diagnostic information is provided as discussed in FIG. 4, while operating system or other application-specific diagnostic information may be gathered by diagnostic tools 516 and provided for access through an additional physical port 518 and again accessed by an operating system or otherwise application-specific diagnostic monitor 520. This requires cross-referencing of the diagnostic information gathered by the operating system or other like software application with the diagnostic information discussed in FIG. 4. Such cross-referencing is tedious and error-prone. Thus, leading to inefficiencies within the development and testing process of the integrated platform software.

Figure 6:
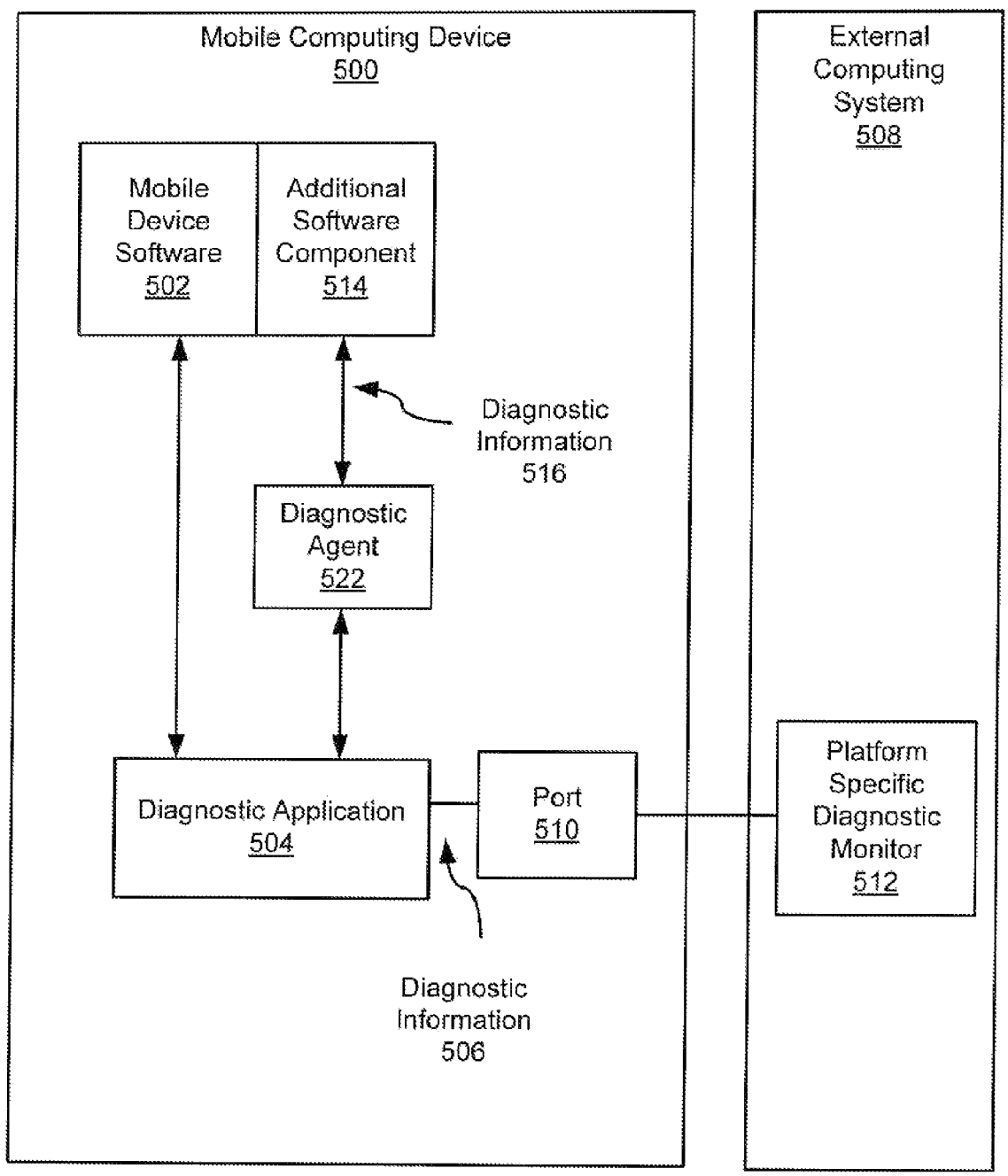
FIG. 6 is a block diagram illustrating the operation of debugging applications on mobile devices in accordance with an embodiment of the present invention.

FIG. 6 eliminates the need for the second physical port 518 and second diagnostic monitor application 520 by having a diagnostic agent 522 that may receive diagnostic information from both the first diagnostic application 504 and the second diagnostic application or tool 516. This diagnostic agent 522 combines the diagnostic information associated with the multiple software components or applications using a common frame of reference. This eliminates the need for individual operators to cross-reference sources of debug information and in so doing provide an improved debugging environment for development and testing of both application and operating system software applications. The improvement derives from the elimination and automation of a tedious and time consuming error prone process. These may then be provided to a platform-specific diagnostic monitor via physical port 510. Thus, specialized tools that, for example in the case of a mobile station, may be related to the debugging and gathering of diagnostic information associated with CDMA-related code may be viewed in a single environment.

Figure 7:
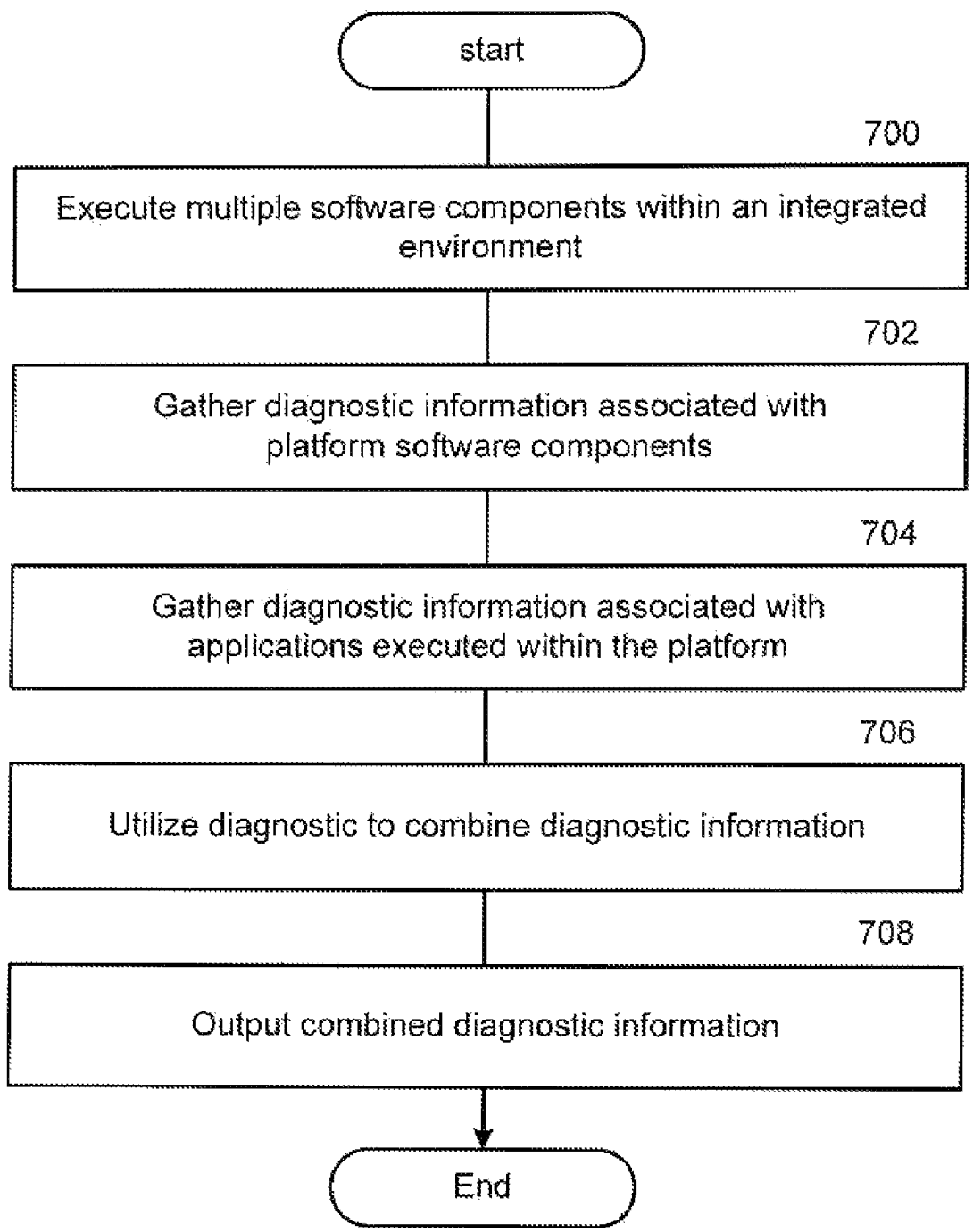
FIG. 7 is a logic flow diagram detailing illustrating the operation of debugging applications on mobile devices in accordance with an embodiment of the present invention.

FIG. 7 provides a logic flow diagram of a method for synchronizing debugging information associated with multiple software components to a common frame of reference. In step 700, the multiple software components may be executed on a common platform, such as a mobile station or wireless terminal. Step 702 allows for the gathering of diagnostic information associated with software components executed within a mobile station, such as mobile station software. Step 704 gathers diagnostic information associated with other software components executed within the mobile station, such as the operating system, and diagnostic information and applications executed within the operating system. Step 706 utilizes a diagnostic agent combined with diagnostic information associated with both the mobile station software gathered in step 702 and the other software components, such as operating systems, gathered in step 704 to be combined using a common frame of reference. Step 708 outputs the combined diagnostic information associated with the multiple software components to an external diagnostic monitor. Such a diagnostic monitor may be executed within a computing system such as a personal computer or other like environment. This diagnostic monitor may include a graphical user interface that allows the filtering of the diagnostic information during development and testing. Such filter may be based on components associated with the diagnostic information, applications associated with the diagnostic information, time frames or other like criteria known to those having skill in the art. The information used to filter the diagnostic information may be contained within metadata associated with the diagnostic information.

Platform quality, application integration quality and testing are all essential to produce a mobile device platform that meets the criteria required of today's operators. Field testing and interoperability testing provide invaluable sources of quality improvement data. The present invention allows this valuable feedback into the development of the protocol stack in order to continually improve and enhance its quality, stability and interoperability. The net effect is an improved and streamlined process to bring new and future technologies to market. Thus, the present invention helps to ensure software products (protocol stacks) are developed within the quality and within the timeframes that manufacturers demand.

In summary, the present invention provides a debugging application operable to synchronize debug information associated with multiple software components to a common frame of reference. These multiple software components may be executed on a common platform and may have distinct diagnostic applications associated with them. This debugging application includes a first diagnostic application operable to gather output diagnostic information associated with the first software application. A second diagnostic application gathers output debug information associated with a second software application. A diagnostic agent receives the diagnostic information associated with both the first software application and the second software application and may combine these using a common frame of reference. This information may then be outputted by the debugging application to an external diagnostic monitor. This eliminates the need for individual operators to cross-reference sources of debug information and in so doing provide an improved debugging environment for development and testing of both application and operating system software applications.

As one of average skill in the art will appreciate, the term "substantially" or "approximately", as may be used herein, provides an industry-accepted tolerance to its corresponding term. Such an industry-accepted tolerance ranges from less that one percent to twenty percent. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by interference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship.

Although the present invention is described in detail, it should be understood that various changes substitutions and alterations can be made hereto without departing from the spirit and scope of the invention as described by the appended claims.

What is claimed is:

1. A non-transitory processor-readable storage medium having stored thereon processor-executable instructions configured to cause a processor to perform operations, the operations being operable to synchronize debug information associated with multiple software components to a common frame of reference, wherein the multiple software components are executed within a common platform, the operations comprising:
   a first diagnostic application operable to gather and output diagnostic information associated with a first software application;
   a second diagnostic application operable to gather and output diagnostic information associated with a second software application; and
   a diagnostic agent operable to:
      receive diagnostic information associated with the first software application from the first diagnostic application;
      receive diagnostic information associated with the second software application from the second diagnostic application;
      combine the diagnostic information associated with the first software application and the second software application using the common frame of reference; and
      output diagnostic information associated with the first software application and the second software application using the common frame of reference wherein: the first diagnostic application is specific to the first software application, and the second diagnostic application is specific to the common platform.

2. The non-transitory processor-readable storage medium storage medium of claim 1, wherein the first software application comprises an operating system.

3. The non-transitory processor-readable storage medium storage medium of claim 2, wherein the operating system is selected from the group consisting of:
Windows®;
Windows® CE;
Symbian®;
Linux®;
Solaris®;
Debian®;
GNU®; and
UNIX®.

4. The non-transitory processor-readable storage medium storage medium of claim 1, wherein the processor-executable instructions are further operable to cause the processor to communicate the combined diagnostic information associated with the first software application and the second software application to an external diagnostic application.

5. The non-transitory processor-readable storage medium storage medium of claim 1, wherein the common platform comprises a mobile device.

6. The non-transitory processor-readable storage medium storage medium of claim 5, wherein the second software application comprises mobile device software application.

7. The non-transitory processor-readable storage medium storage medium of claim 1, wherein:
the common platform comprises a mobile device;
the first software application comprises an operating system; and
the second software application comprises mobile device software application.

8. A non-transitory processor-readable storage medium having stored thereon processor-executable instructions configured to cause a processor to perform operations, the operations being operable to synchronize debug information associated with multiple software components to a common frame of reference, wherein the multiple software components are executed with a mobile device, wherein the processor-executable instructions comprise:
a first diagnostic application operable to gather and output diagnostic information associated with an operating system;
a second diagnostic application operable to gather and output diagnostic information associated with a mobile device software application; and
a diagnostic agent operable to:
receive diagnostic information associated with the operating system from the first diagnostic application;
receive diagnostic information associated with the mobile device software application from the second diagnostic application;
combine the diagnostic information associated with the operating system and the mobile device software application using the common frame of reference; and
output diagnostic information associated with the operating system and the mobile device software application using the common frame of reference wherein:
the first diagnostic application is specific to the first software application, and the second diagnostic application is specific to a common platform.

9. The non-transitory processor-readable storage medium storage medium of claim 8, wherein the operating system is selected from the group consisting of:
Windows®;
Windows® CE;
Symbian®;
Linux®;
Solaris®;
Debian®;
GNU®; and
UNIX®.

10. The non-transitory processor-readable storage medium storage medium of claim 8, wherein the processor-executable instructions are operable to cause the processor to communicate the combined diagnostic information associated with the operating system and the mobile device software application to an external diagnostic application.

11. The non-transitory processor-readable storage medium storage medium of claim 10, wherein the mobile device is operable to communicatively couple to a computing system and wherein the external diagnostic application is executed on the computing system.

12. The non-transitory processor-readable storage medium storage medium of claim 11, wherein the mobile device communicatively couple to the computing system through a physical port.

13. The non-transitory processor-readable storage medium storage medium of claim 11, wherein the external diagnostic application is operable to filter the combined diagnostic information associated with the operating system and the mobile device software application using metadata associated with the diagnostic information associated with the operating system and the mobile device software application.

14. The non-transitory processor-readable storage medium storage medium of claim 13, wherein the external diagnostic application is operable to filter the combined diagnostic information associated with the operating system and the mobile device software application based on a component associated with the diagnostic information.

15. A method for synchronizing debugging information associated with multiple software components to a common frame of reference, comprising:
executing the multiple software components within a mobile device;
gathering a first set of diagnostic information associated with an operating system;
gathering a second set diagnostic information associated with a mobile device software application;
using a diagnostic agent to combine the first set of diagnostic information and the second set of diagnostic information using the common frame of reference; and
outputting the combined diagnostic information associated with the operating system and the mobile device software application using the common frame of reference to a diagnostic monitor wherein:
the first set of diagnostic information is generated by an application specific to the operating system, and
the second set of diagnostic information is generated by an application specific to the mobile device.

16. The method of claim 15, wherein the operating system is selected from the group consisting of:
Windows®;
Windows® CE;
Symbian®;
Linux®;
Solaris®;
Debian®;
GNU®; and
UNIX®.

17. The method of claim 15, wherein the external diagnostic application is executed within a computing system communicatively coupled to the mobile device.

18. The method of claim 17, wherein the mobile device communicatively couples to the computing system through a physical port.

19. The method of claim 15, further comprising filtering the combined diagnostic information associated with the operating system and the mobile device software application using metadata associated with the diagnostic information.

20. The method of claim 19, wherein the metadata allows an operator to filter the diagnostic information based on a component associated with the diagnostic information.

21. An apparatus comprising:
a processor; and
a memory, the memory having stored thereon processor-executable instructions configured to cause the processor to perform operations, the operations being operable to synchronize debug information associated with multiple software components to a common frame of reference, wherein the multiple software components are executed within a common platform, the processor-executable instructions comprising:
  a first diagnostic application operable to gather and output diagnostic information associated with a first software application;
  a second diagnostic application operable to gather and output diagnostic information associated with a second software application; and
  a diagnostic agent operable to:
    receive diagnostic information associated with the first software application from the first diagnostic application;
    receive diagnostic information associated with the second software application from the second diagnostic application;
    combine the diagnostic information associated with the first software application and the second software application using the common frame of reference; and
    output diagnostic information associated with the first software application and the second software application using the common frame of reference
  wherein:
    the first diagnostic application is specific to the first software application, and
    the second diagnostic application is specific to the common platform.

22. The apparatus of claim 21, wherein the first software application comprises an operating system.

23. The apparatus of claim 21, wherein the operating system is selected from the group consisting of:
Windows®;
Windows® CE;
Symbian®;
Linux®;
Solaris®;
Debian®;
GNU®; and
UNIX®.

24. The apparatus of claim 21, wherein the processor-executable instructions are operable to cause the processor to communicate the combined diagnostic information associated with the first software application and the second software application to an external diagnostic application.

25. The apparatus of claim 21, wherein the common platform comprises a mobile device.

26. The apparatus of claim 25, wherein the second software application comprises mobile device software application.

27. The apparatus of claim 21, wherein:
the common platform comprises a mobile device;
the first software application comprises an operating system; and the second software application comprises mobile device software application.

* * * * *